(12) United States Patent
Oida et al.

(10) Patent No.: US 7,083,171 B2
(45) Date of Patent: Aug. 1, 2006

(54) METAL SEAL AND ATTACHMENT METHOD FOR THE SAME AND TIGHT-SEAL CONSTRUCTION

(75) Inventors: Hironori Oida, Arida (JP); Tetsuya Ashida, Arida (JP); Takayoshi Mitsui, Arida (JP)

(73) Assignee: Mitsubishi Cable Industries, Ltd., Amagasaki (JP)

( * ) Notice: Subject to any disclaimer, the term of this patent is extended or adjusted under 35 U.S.C. 154(b) by 0 days.

(21) Appl. No.: 11/179,485

(22) Filed: Jul. 13, 2005

(65) Prior Publication Data
US 2005/0242530 A1 Nov. 3, 2005

Related U.S. Application Data

(62) Division of application No. 10/620,372, filed on Jul. 17, 2003, now Pat. No. 7,004,479.

(30) Foreign Application Priority Data

| Jul. 19, 2002 | (JP) | ............... 2002-211097 |
| Jan. 16, 2003 | (JP) | ............... 2003-008765 |
| Apr. 8, 2003 | (JP) | ............... 2003-103577 |
| May 19, 2003 | (JP) | ............... 2003-139843 |

(51) Int. Cl.
*F16J 15/02* (2006.01)

(52) U.S. Cl. ............... 277/644; 277/626; 277/649

(58) Field of Classification Search ............... 277/626, 277/644, 649
See application file for complete search history.

(56) References Cited

U.S. PATENT DOCUMENTS

| 1,965,273 | A | * | 7/1934 | Wilson ............... 277/614 |
| 3,163,431 | A | | 12/1964 | Tanner ............... 277/206 |
| 3,171,662 | A | | 3/1965 | Warn ............... 277/211 |
| 3,199,878 | A | * | 8/1965 | Cunningham et al. ...... 277/322 |
| 3,567,258 | A | * | 3/1971 | Scaramucci ............... 285/334.4 |
| 3,602,532 | A | | 8/1971 | Ehrenberg ............... 285/364 |
| 3,754,766 | A | | 8/1973 | Asplund ............... 277/236 |
| 4,289,318 | A | | 9/1981 | Cather et al. ............... 277/12 |
| 4,813,692 | A | | 3/1989 | Halling et al. ............... 277/236 |
| 5,954,343 | A | | 9/1999 | Sumida et al. ............... 277/434 |
| 6,619,668 | B1 | | 9/2003 | Pyre ............... 277/644 |

* cited by examiner

*Primary Examiner*—Alison K. Pickard
(74) *Attorney, Agent, or Firm*—Armstrong, Kratz, Quintos, Hanson & Brooks, LLP

(57) ABSTRACT

A metal seal of ring as a whole disposed between a first contact flat face portion and a second contact flat face portion parallel to each other. This metal seal has a middle base portion, a first contact convex portion, and a second contact convex portion. The first contact convex portion protrudes from an inner side and the second contact convex portion protrudes from an outer side. The metal seal generates torsional elastic deformation around the middle base portion as a center in an attached and compressed state.

1 Claim, 15 Drawing Sheets

Fig. 1
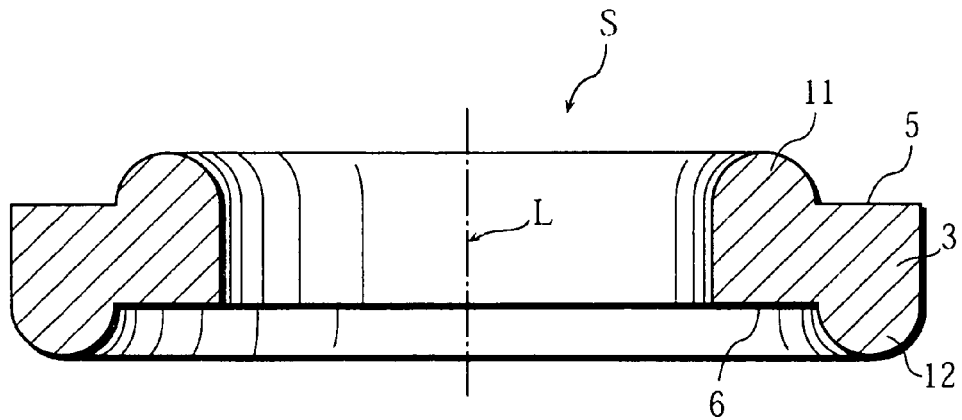
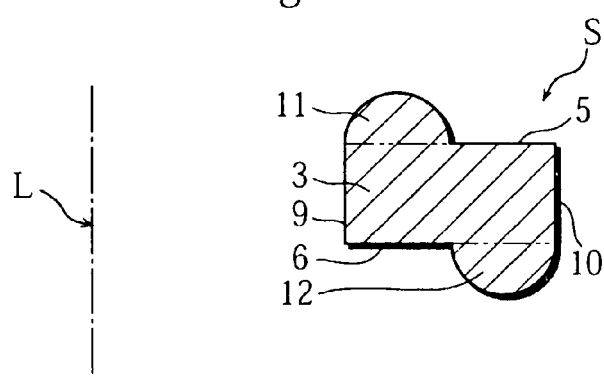
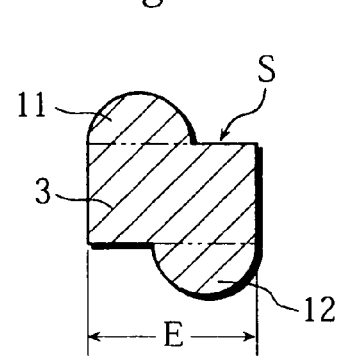
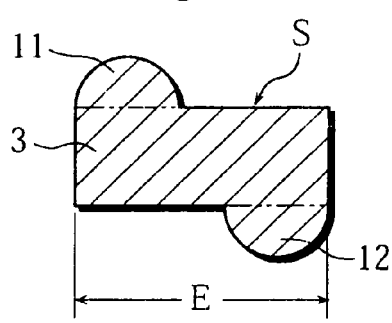
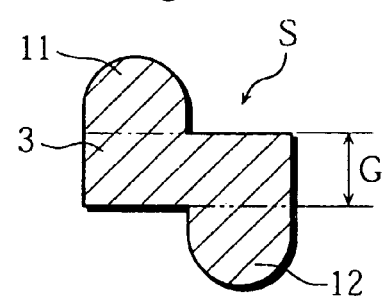

METAL SEAL AND ATTACHMENT METHOD FOR THE SAME AND TIGHT-SEAL CONSTRUCTION

This application is a divisional application of U.S. Ser. No. 10/620,372, filed Jul. 17, 2003, now U.S. Pat. No. 7,004,479.

BACKGROUND OF THE INVENTION

1. Field of the Invention

This invention relates to a metal seal and an attachment method for the same and a tight-seal construction.

2. Description of the Related Art

Conventionally, various materials such as rubber, resin, etc. have been used to make a seal for a fixation flange for vacuum, inner pressure, and outer pressure. Especially, a metal seal is often used under severe conditions such as high vacuum, high pressure (inner pressure and outer pressure), high temperature, low temperature, and application to corrosive fluids.

However, this metal seal has problems below. That is to say, a conventional metal seal has generally high fastening force, thickness of the flange as an application member (seal attachment member) must be increased, and weight and volume (space for installment) of the apparatus is increased thereby. And, in a conventional metal seal 31 shown in FIG. 4, local plastic deformation is generated on the metal seal 31 disposed between a pair of flat faces 32 and 33 parallel to each other by pressing seal portions $K_1$ and $K_2$, the flat faces 32 and 33, namely, application members 34 and 35 such as flanges are damaged, and reuse of the application members 34 and 35 such as flanges becomes problematic. Naturally, high cost and long time are required to disassemble the apparatus for maintenance and checkup.

The conventional metal seal 31 as shown in FIG. 4, partially and plastically deformed on the pressing seal portions $K_1$ and $K_2$, damages the flat faces 32 and 33 because the metal seal 31 is hardly deformed elastically for high rigidity and receiving fastening force (in the mutual closing directions of the flat faces 32 and 33) directly.

It is therefore an object of the present invention to provide a metal seal easily and economically made, of which fastening force is (despite a metal seal) small and resilient force is large, and thickness of a flange as the application member (attachment member) can be small to contribute to light weight and compactification of the whole apparatus.

And, it is another object of the present invention to provide a metal seal and an attachment method for the metal seal with which the attachment member (application member) of brittle material such as ceramic and soft material such as aluminum can be used for a long time without being damaged, and to provide a metal seal with which stable sealability is always demonstrated without dispersion even when tolerance of depth dimension of sealing groove is high, range of set height within the seal is used is wide, and the seal is easily attached.

Further, it is another object of the present invention to provide a metal seal with which fluid leakage such as blowby is effectively prevented when high pressure works.

BRIEF DESCRIPTION OF THE DRAWINGS

The present invention will be described with reference to the accompanying drawings in which:

FIG. 1 is a cross-sectional front view showing an embodiment of the present invention;

FIG. 2A is a cross-sectional view showing an embodiment of the present invention;

FIG. 2B is a cross-sectional view showing an embodiment of the present invention;

FIG. 2C is a cross-sectional view showing an embodiment of the present invention;

FIG. 2D is a cross-sectional view showing an embodiment of the present invention;

DESCRIPTION OF THE PREFERRED EMBODIMENTS

Preferred embodiments of the present invention will now be described with reference to the accompanying drawings.

Figure 3:
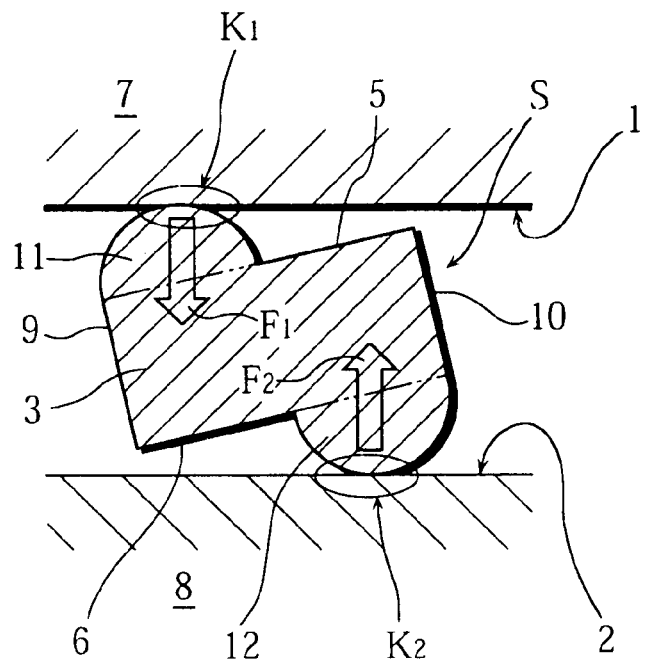
FIG. 3 is a working-explanatory view of the present invention.

FIG. 1 and FIG. 2A are cross-sectional front views in a free state (unattached state) showing an embodiment of a metal seal S relating to the present invention, and FIG. 3 and FIG. 5A are explanatory cross-sectional views of a principal portion in a used state, namely, attached and compressed state.

The metal seal S is composed of metal such as stainless steel, spring steel, and other metals, made by mechanical work such as cutting and grinding, or made by plastic work. And, welding may be added. A regular size material is bent into a ring, both ends are connected by welding to form a closed loop as a whole.

And, the metal seal S, having a ring shape such as circular, oval, elliptic, approximately rectangular (in top view), is disposed between a pair of a first contact flat face portion 1 and a second contact flat face portion 2. To describe a cross-sectional configuration, the cross-sectional configuration is composed of an approximately rectangular middle base portion 3, a first contact convex portion 11 and a second contact convex portion 12 both of which are approximately half circular. The first contact convex portion 11 contacts the first contact flat face portion 1 and the second contact convex portion 12 contacts the second contact flat face portion 2. An outline of the cross-sectional configuration of the middle base portion 3 is shown with two-dot broken lines in FIG. 2A and FIG. 3, and end faces (long sides) 5 and 6 at right angles with an axis L direction of the middle base portion 3 are parallel to the above-mentioned first and second contact flat face portions 1 and 2 of application members (attachment members such as flanges) 7 and 8.

Notably, the first contact convex portion 11 is protruding from an inner position of the end face (long side) 5 of the middle base portion 3, and the second contact convex portion 12 is protruding from an outer position of the end face (long side) 6 of the middle base portion 3.

In short, the first contact convex portion 11 and the second contact convex portion 12 are protruding in opposite directions in the axis direction as to dislocate each other on the inner side and the outer side in radial directions with respect to the middle base portion 3 of rectangular cross section. Further, a short side 9 (forming an inner peripheral face) of the middle base portion 3 of rectangular cross section and the approximately half circular first contact convex portion 11 are continuous (without stages) in Figures. And, a short side 10 (forming an outer peripheral face) of the middle base portion 3 of rectangular cross section and the second contact convex portion 12 are continuous (without stages).

And, as shown in FIG. 3, when the first contact flat face portion 1 of the application member 7 and the second contact flat face portion 2 of the application member 8 come close each other and become an attached and compressed state, the seal inclined (turned) from FIG. 2A to FIG. 3 around the middle base portion 3 by pressing forces F.sub.1 and F.sub.2 from the pair of the first contact flat face portion 1 and the second contact flat face portion 2 to generate torsional elastic deformation. This torsional elastic deformation returns to the original state in FIG. 2A, namely, the free state when the pair of the first and second contact flat face portions 1 and 2 are parted from each other.

Figure 4:
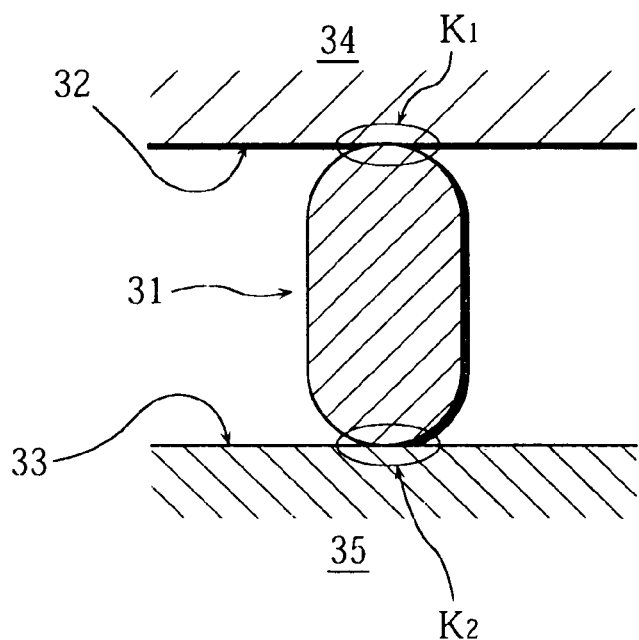
FIG. 4 is an explanatory view of a conventional problem.

In the conventional metal seal 31 shown in FIG. 4, although the closing of the flat faces 32 and 33 is received by compression of the almost static metal seal 31, the pressing seal portions K.sub.1 and K.sub.2 are locally and plastically deformed and damaged after the highly rigid metal seal 31 is slightly deformed elastically, and the application members 34 and 35 are damaged at the same time. On the contrary, in the metal seal S relating to the present invention, the pressing seal portion K.sub.1 where the first contact convex portion 11 contacts the first contact flat face portion 1 and the pressing seal portion K.sub.2 where the second contact convex portion 12 contacts the second contact flat face portion 2 are prevented from (or reduced of) being plastically deformed by softly receiving the pressing forces F.sub.1 and F.sub.2 of the application members 7 and 8 (the first and second contact flat face portions 1 and 2) with the torsional elastic deformation by artfully inclining or turning around the middle base portion 3, and, the first and second contact convex portions 11 and 12 and the first and second contact flat face portions 1 and 2 are prevented from being damaged thereby.

FIGS. 2B, 2C, and 2D are lateral cross-sectional views showing various embodiments. In comparison with FIG. 2A, a dimension E of the middle base portion 3 (of which peripheral parts are shown with two-dot broken lines) in a diameter direction is small, and the cross section of the middle base portion 3 is a rectangle nearly square in FIG. 2B. In FIG. 2C, on the contrary, the dimension E of the middle base portion 3 in a diameter direction is large, and the cross sectional configuration of the middle base portion 3 is set to be thin rectangular (flat rectangular). And, in FIG. 2D, a dimension in the axis direction of the middle base portion 3, namely, a length of the short side is set to be smaller than that of FIG. 2A to make the cross section thin rectangular (flat rectangular).

In order of 2B, 2A, and 2C, the torsional elastic deformation is gradually becomes easier to be generated, and the fastening force is reduced. And, the seal in FIG. 2D more easily generates the torsional elastic deformation and has smaller fastening force than that in FIG. 2A.

Next, FIGS. 5A and 5B are explanatory views of an attachment method for the metal seal S.

In FIG. 5A, damaged portions J.sub.1 and J.sub.2 shown with short solid lines may be generated on the first and second contact flat face portions 1 and 2. That is to say, the damaged portion J.sub.1 on the inner side may be generated on the first contact flat face portion 1 by the first contact convex portion 11 of the metal seal S, and the damaged portion J.sub.2 on the outer side may be generated on the second contact flat face portion 2 by the second contact convex portion 12 of the metal seal S. As shown in FIG. 5A, this assembled state in which the first contact convex portion 11 corresponds to (contacts) the first contact flat face portion 1 is defined as a first assembled state.

In this case, the seal is overturned and attached as FIG. 5B. That is to say, the attachment member (application member) 7 and the attachment member (application member) 8 are opened to take out the metal seal S and make the metal seal upside down (overturn the metal seal) to set the metal seal in a second assembled state in which the second contact convex portion 12 corresponds to the first contact flat face portion 1. As clearly shown in FIG. 5B, the damaged portions $J_1$ and $J_2$ do not contact the overturned second and first contact convex portions 12 and 11 but new faces, and operation period is extended twice, namely, life of the application members 7 and 8 is made twice.

In the metal seal S of the present invention, the life is extended by the assembly (attachment) with overturn utilizing the difference between the positions in the diameter direction (distances from the axis L) of the first contact convex portion 11 and the second contact convex portion 12.

Figure 6:
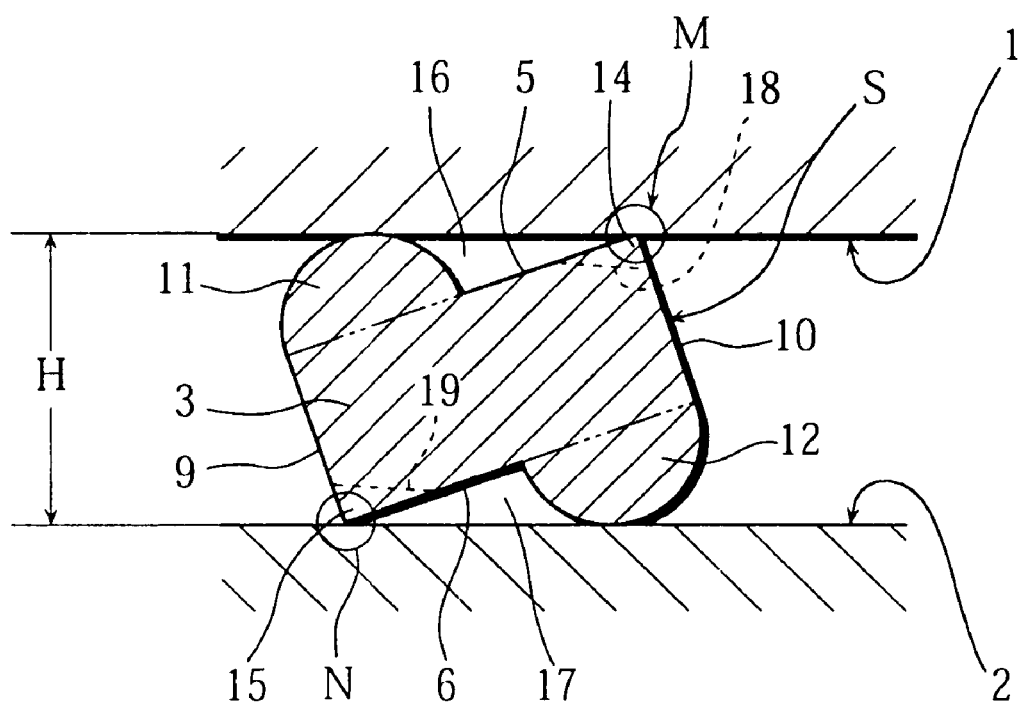
FIG. 6 is a cross-sectional view showing another embodiment.

Next, FIG. 6 shows a compressed state in which corner portions 14 and 15 shown with circles M and N contact the first and second contact flat face portions 1 and 2, when gap dimension (height dimension of the seal) between the first and second contact flat face portions 1 and 2 is reduced further from the state of FIG. 3. In this case, approximately triangle spaces 16 and 17 are tightly closed (air wells). When the spaces 16 and 17 as air wells are formed, the seal needs a long time to reach for a predetermined degree of vacuum as a vacuum seal, and to reach for a predetermined pressure as an inner pressure seal or an outer pressure seal. And, it also takes a long time to replace (change) the sealed fluid with another kind of fluid. Further, when a special kind of fluid is used in the tube, the fluid is mixed with fluid and air (of a former process) remaining in the air well.

Although it is desirable not to form the spaces 16 and 17, it does not exclude an operation method (state), in which the spaces 16 and 17 are formed, from the technical scope of the present invention.

So small notched portions 18 and 19 are formed on the corner portions 14 and 15 as shown with broken lines in FIG. 6 to let the fluid out of the spaces 16 and 17. Small through holes may be formed in the middle base portion 3 to escape the fluid (not shown in Figures). And, it is preferable to make the corner portions 14 and 15 R-shaped (round) to prevent the corner portions 14 and 15 from damaging the first and second contact flat face portions 1 and 2 in contact.

Figure 7:
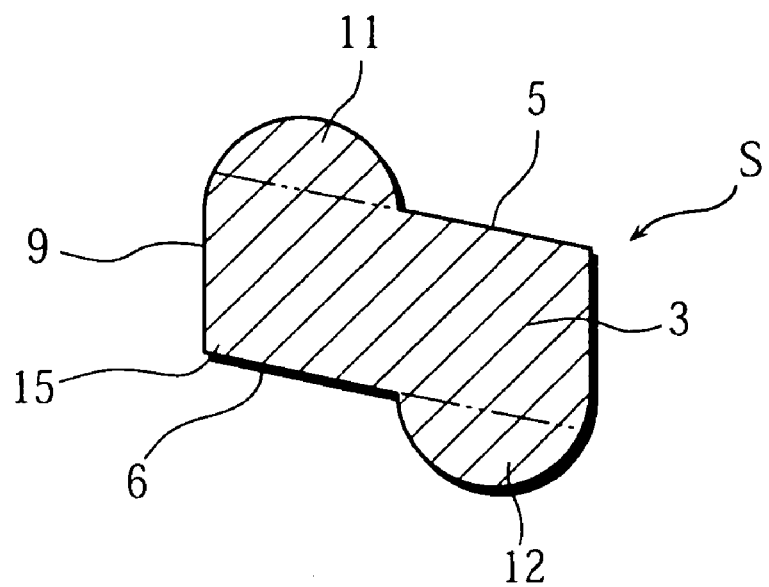
FIG. 7 is a cross-sectional view showing still another embodiment.
Figure 13:
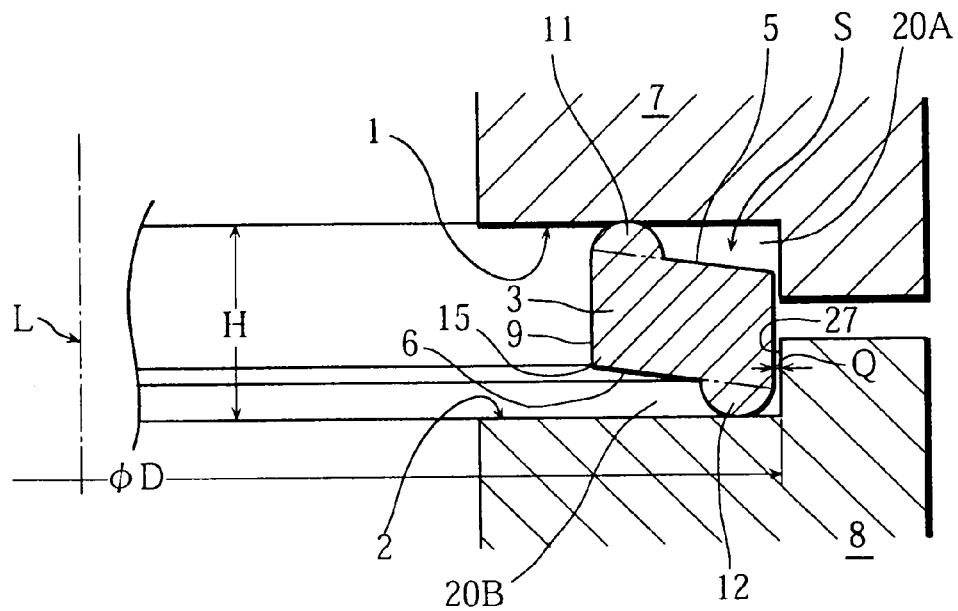
FIG. 13 is an explanatory view serving as both of a cross-sectional view of a principal portion showing a used state of the metal seal of the present invention and a FEM analytic view.

Next, in another embodiment shown in FIG. 7 and FIG. 13, cross section of the middle base portion 3 is approximately rectangular such as a parallelogram, the end face 5 is formed as a sloped face (tapered face) as a gap 20A, between the end face 5 of the middle base portion 3 from which the first contact convex portion 11 is protruding and the first contact flat face portion 1, is gradually increased toward the outer side in an attached and uncompressed state in FIG. 13. Further, the end face 6 is formed as a slope face (tapered face) as a gap 20B, between the end face 6 of the middle base portion 3 from which the second contact convex portion 12 is protruding and the second contact flat face portion 2, is gradually increased toward the inner side in an attached and uncompressed state in FIG. 13.

Figure 14:
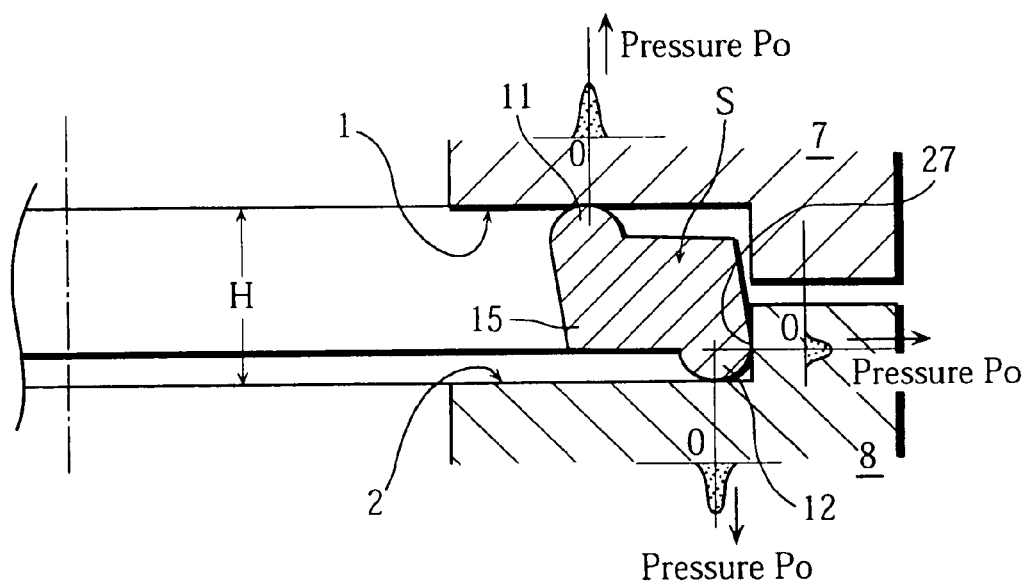
FIG. 14 is an explanatory view serving as both of a cross-sectional view of a principal portion showing a used state of the metal seal of the present invention and a FEM analytic view.
Figure 15:
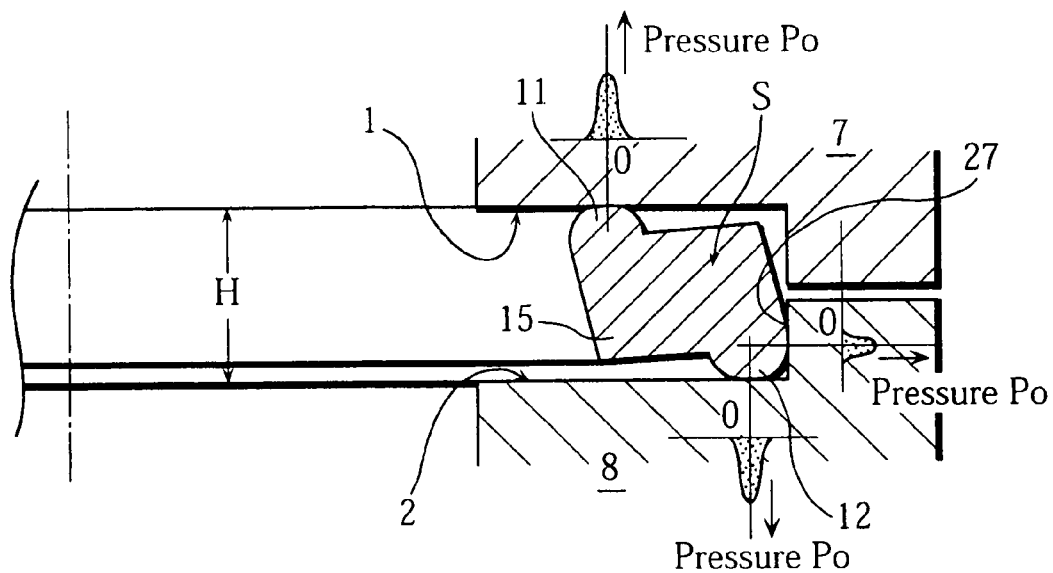
FIG. 15 is an explanatory view serving as both of a cross-sectional view of a principal portion showing a used state of the metal seal of the present invention and a FEM analytic view.
Figure 16:
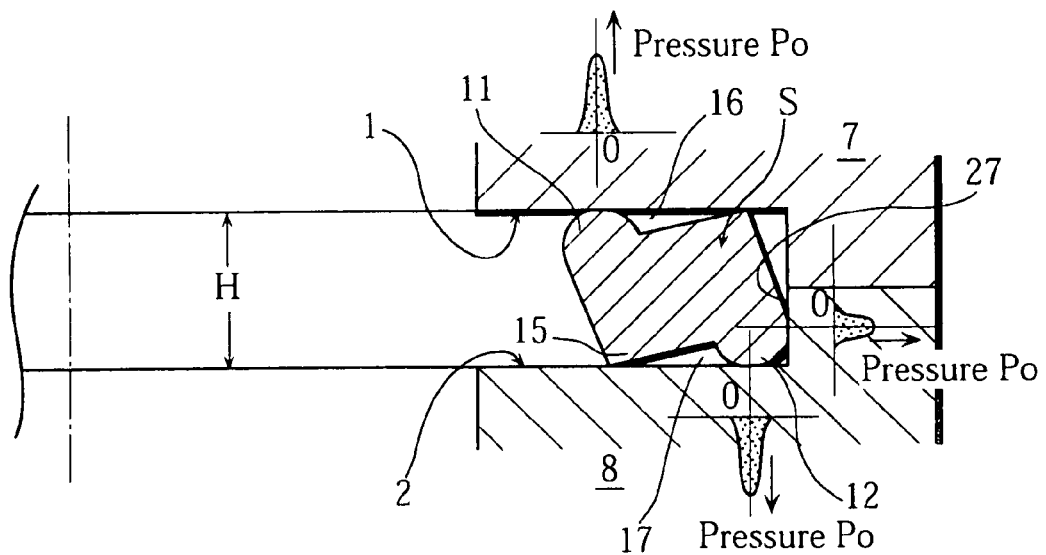
FIG. 16 is an explanatory view serving as both of a cross-sectional view of a principal portion showing a used state of the metal seal of the present invention and a FEM analytic view.

As shown in the attached and non-compressed state of FIG. 13 and attached and compressed state as shown in FIGS. 14 through 16 in which an interval dimension H between the first and second contact flat face portions 1 and 2 is reduced serially, the corner portion 15 formed by the short side 9 on the inner peripheral face side and the end face (long side) 6 does not easily contact (become tangent to) the second contact flat face portion 2. The second contact flat face portion 2 is prevented from being damaged (by the corner portion 15) thereby. And, changing amount of the interval dimension (set height or height of the seal) H from FIG. 13 to FIG. 15 (or FIG. 16) is increased, resilience as the metal seal S is high, namely, elastic deformation area is wide. This brings the following advantages. Sufficient sealability is achieved even if dispersion exists in dimensional accuracy of the attachment members 7 and 8 such as flanges because the tolerance of the compressed portion in the used state is high and the seal is used within the wide range of the set height H. And, stable sealability is achieved following pressure (changing) cycles and temperature (changing) cycles.

Figure 8:
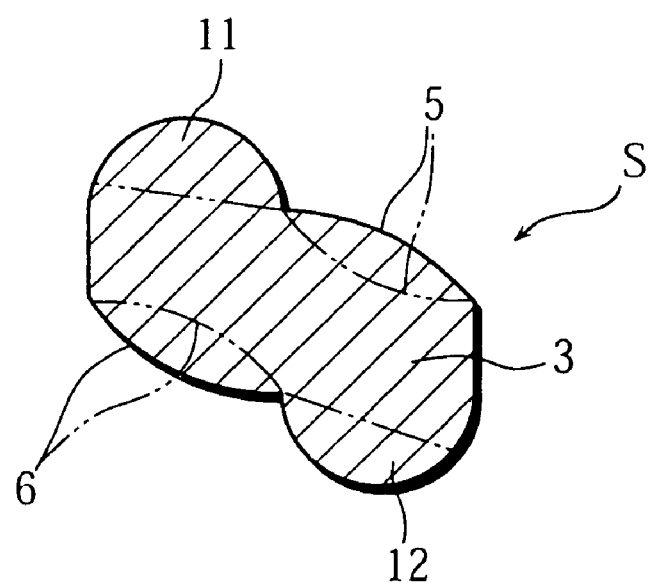
FIG. 8 is a cross-sectional view showing a further embodiment.

Next, as still another embodiment shown in FIG. 8, it is also preferable to form the end faces 5 and 6 of the sloped face (tapered face) in FIG. 7 curved as R-shaped (refer to solid lines) or concave as R-shaped (refer to two-dot broken lines). These forms can be selected in consideration of the shapes of concave portions and concave grooves of the application members 7 and 8, and degree of dispersion in dimensional accuracy.

Figure 9:
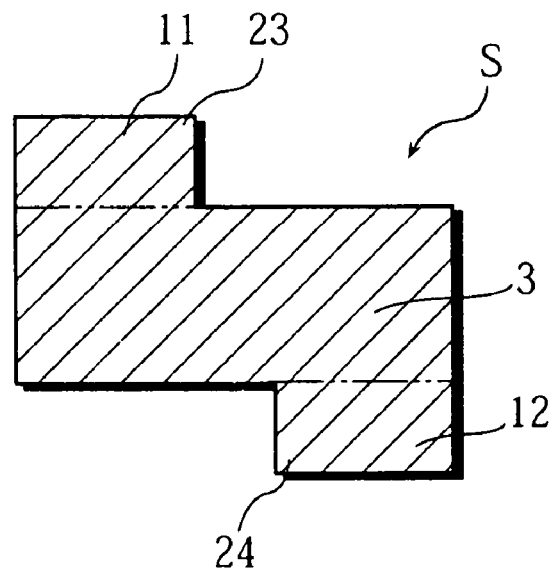
FIG. 9 is a cross-sectional view showing a still further embodiment.
Figure 10:
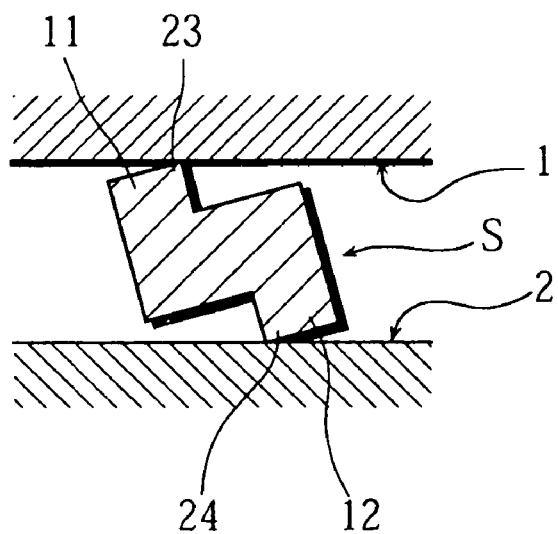
FIG. 10 is an explanatory view of a used state.

FIG. 9 and FIG. 10 show another embodiment in which the cross section of the middle base portion 3 is rectangular and the cross sections of the first contact convex portion 11 and the second contact convex portion 12 are also rectangular, and the cross section of the whole seal is a right-angled Z shape. This metal seal S makes torsional elastic deformation as in FIG. 10 in the attached and compressed state. That is to say, a corner portion 23 on the outer side of the small rectangular first contact convex portion 11 and a corner portion 24 on the inner side of the small rectangular second contact convex portion 12 are pressed to the first and second contact flat face portions 1 and 2. With this construction, sharp edges (of the corner portions 23 and 24) bite into the first and second contact flat face portions 1 and 2 to make high sealability.

Figure 11A:
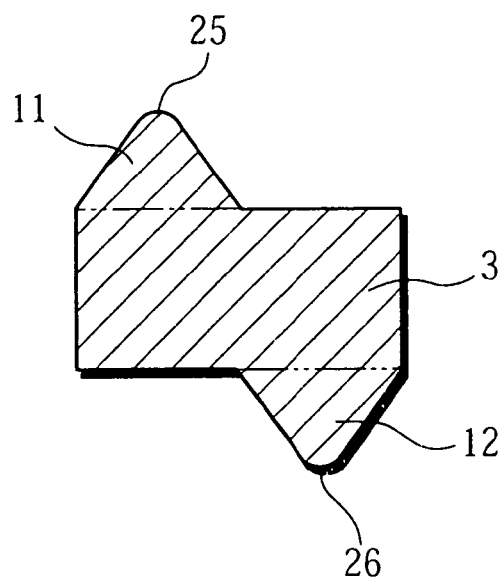
FIG. 11A is a cross-sectional view showing another embodiment.
Figure 11B:
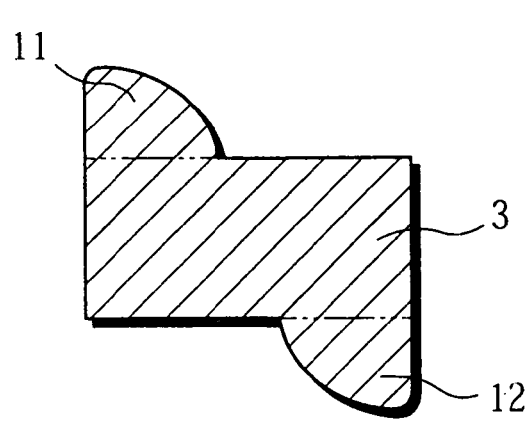
FIG. 11B is a cross-sectional view showing another embodiment.

And, FIG. 11A is a cross-sectional view showing still another embodiment different from the embodiments of FIGS. 2A through 2D in that the first contact convex portion 11 and the second contact convex portion 12 are approximately triangle. Other parts are constructed similar to FIGS. 2A through 2D. Peaks 25 and 26 of the approximately triangle first and second contact convex portions 11 and 12 are freely formed small R-shaped, flat, or sharp-edged. And, as shown in FIG. 11B, it is also preferable to make only portions which contact the first and second contact flat face portions 1 and 2 arc-shaped in the cross-sectional configuration of the first and second contact convex portions 11 and 12. That is to say, each of the first and second contact convex portions 11 and 12 is made quarter circular. With this configuration, similar effect (to the sealability-enhancing effect by the torsional elastic deformation) can be obtained by a seal of which amount of material is smaller. Although not shown in Figures, it is also preferable to form the middle base portion 3 of FIG. 9 or FIGS. 11A and 11B sloped (tapered) as in FIGS. 7 and 8.

Figure 12:
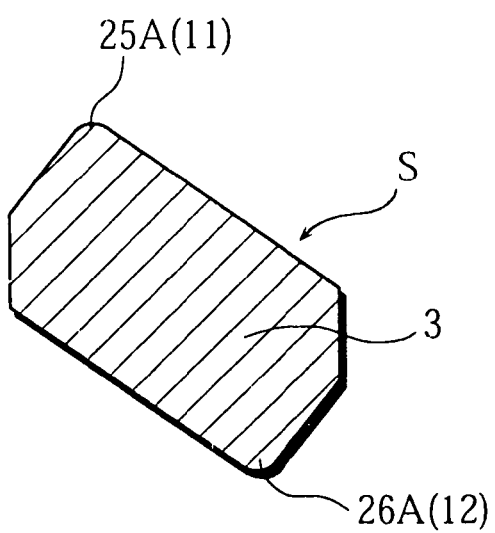
FIG. 12 is a cross-sectional view showing still another embodiment.

As another embodiment shown in FIG. 12, the middle base portion 3 itself may be sloped (tapered) and the first and second contact convex portions 11 and 12 may be composed of corresponding peaks 25A and 26A. The peaks 25A and 26A are freely formed small R-shaped, flat, or sharp-edged.

In the characteristic construction shown in FIGS. 13 through 16, a restriction inner peripheral face 27 is continued from the second contact flat face portion 2 to form a concave portion (concave groove) on the attachment member 8. Although in the attached and non-compressed state shown in FIG. 13, a micro aperture Q is formed, the peripheral face of the second contact convex portion 12 contacts the restriction inner peripheral face 21 as the second contact convex portion 12 contacts two points one of which is on the second contact flat face portion 2 and the other of which is on the restriction inner peripheral face 27.

To describe further in detail, the metal seal S contacts on 3 positions (3 points) as a whole because the first contact convex portion 11 contacts the first contact flat face portion 1 on a position (a point) other than the two positions (points) above. Therefore, excessive inclination (excessive torsional elastic deformation) of the metal seal S can be Prevented by pressure of the first and second contact flat face portions 1 and 2 mutually come close with the construction of the two-position (two-point) contact of the second contact convex portion 12. And, reactional force by torsion is effectively generated by the prevention of excessive inclination, the state in FIG. 15 is preferably a final set and used state to prevent the air wells (the spaces 16 and 17) generated by the excessive inclination as in FIG. 16. Further, the pressing force toward the application member 8 is dispersed by the two-point contact of the second contact convex portion 12 to prevent the second contact flat face portion 2 from being damaged.

When the metal seal S relating to the present invention is applied to a manufacturing apparatus for semiconductor, one of the application members (attachment members) 7 and 8 may be made of stainless steel, and the other nay be made of soft metal such as aluminum. In this case, the two-point contact side, namely, the side which contacts the second contact convex portion 12, is made of soft metal such as aluminum to reduce the damage.

A small seal, of which height (corresponding to the dimension H in FIG. 13) is 1.4 mm and an outer diameter D is 7.3 mm in free state, was made of stainless steel of SUS316L double-melt. This sample was tested for elastic resilience, etc. FIGS. 13 through 16 show the analysis of elastic deformation of the metal seal S with FEM (Finite Element Method) analysis, and analytic values of contact pressure $P_0$ on the 3 contact positions are also shown with graphs.

FIG. 13 shows the non-compressed state in which the interval dimension (set height or height of the seal) H between the first and second contact flat face portions 1 and 2 is 1.40 mm. The interval dimension H is 1.32 mm in FIG. 14, 1.22 mm in FIG. 15, and 1.12 mm in FIG. 16. As clearly shown in FEM analytic charts in FIGS. 13 through 16, approximately stable and appropriate contact pressure $P_0$ is maintained and stable sealability is demonstrated within this wide changing range of the interval dimension (set height) H.

In other words, the metal seal S relating to the present invention is effective even for an extremely small seal like the sample above, having small fastening force (with low load), high resilience, and a wide area until plastic deformation, namely, wide elastic deformation area. The metal seal S, of which cross section is mostly composed of straight lines, is easily and economically cut to sufficiently correspond to small sizes which is difficult and expensive to make with a metal O-ring.

Although the metal seal S has a block-shaped and stubby cross-sectional configuration, sufficient sealability (sealing performance) is achieved with low fastening force by complex torsional elastic deformation with inclination (turning). Taking advantage of low fastening force, the metal seal can be used instead of a conventional O-ring of rubber under severe conditions that a conventional O-ring can not be applied such as high temperature, low temperature, plasma radiation, and ozone atmosphere.

The above-mentioned SUS316L double-melt, including very little impurity such as carbon, is appropriate as a material for a manufacturing apparatus of semiconductor which requires purity.

The surface finish of the metal seal S is freely selected from the following finishing methods, namely, {circle over (1)} plating with silver, gold, copper, tin, etc., {circle over (2)} various resin coatings of PTFE, FEP, etc., {circle over (3)} coatings of various rubber materials, {circle over (4)} super polishing finish, and {circle over (5)} cutting, grading, or press working. And, as the sealed fluid, depending on the surface coating and material, vacuum, various gases (such as $CO_2$, $H_2$, $O_2$, $NH_3$, $H_2O$), and various liquids (such as $H_2O$, $H_2SO_4$, HCl) can be used. The metal seal S is excellent in low fastening force, large amount of elastic resilience, easy handling, small number of parts, and, easy and economical production. Therefore, the seal is applicable to the application members (such as flanges) 7 and 8 of brittle materials such as ceramic and of soft materials such as aluminum, to parts under plasma or ozone radiation as a manufacturing apparatus of semiconductor, and to a wide temperature range from low to high temperature. And, the seal can be applied to the application members (such as flanges) 7 and 8 of rough dimensional accuracy and tolerance, and one common metal seal S may correspond to both of shallow and deep grooves. Further, the seal is having large amount of elastic resilience to be applied to parts under great changes in pressure and temperature, reusable, and easy to handle (assemble). Further, life of the seal is easily extended by overturning the seal.

Figure 17:
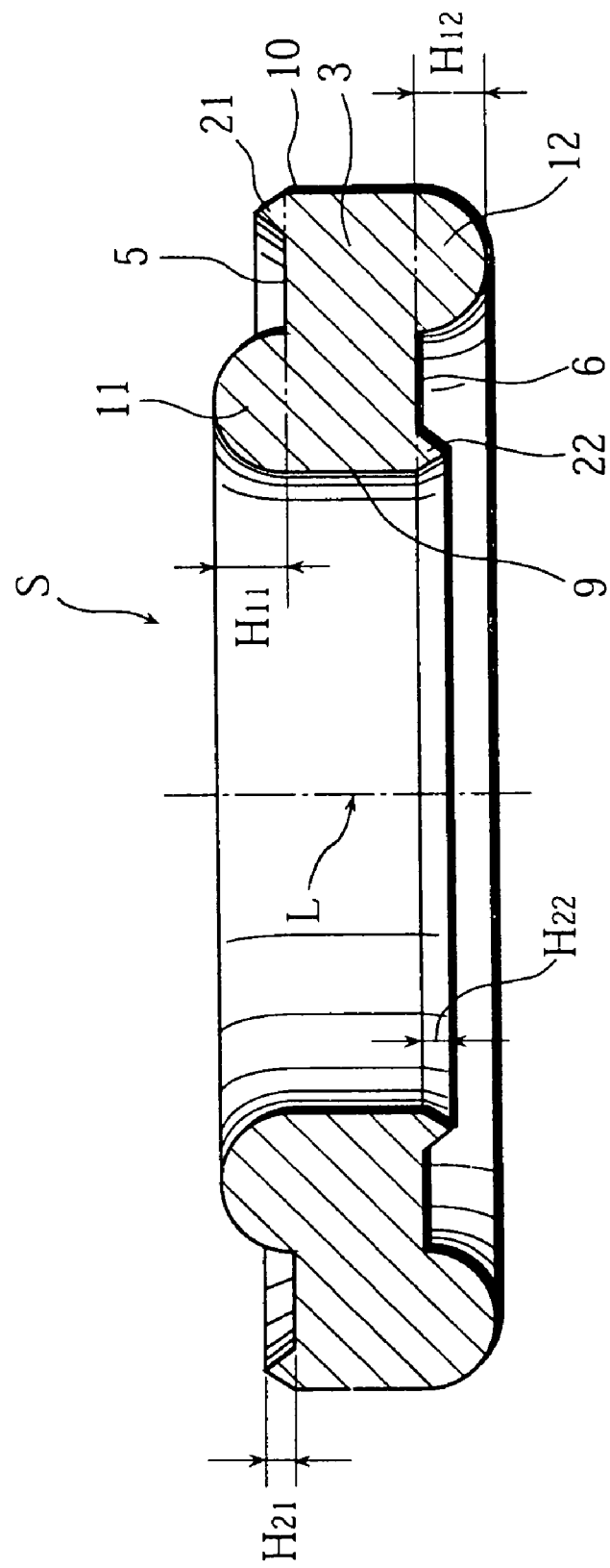
FIG. 17 is a cross-sectional front view in a free state showing a further embodiment of the present invention.
Figure 18:
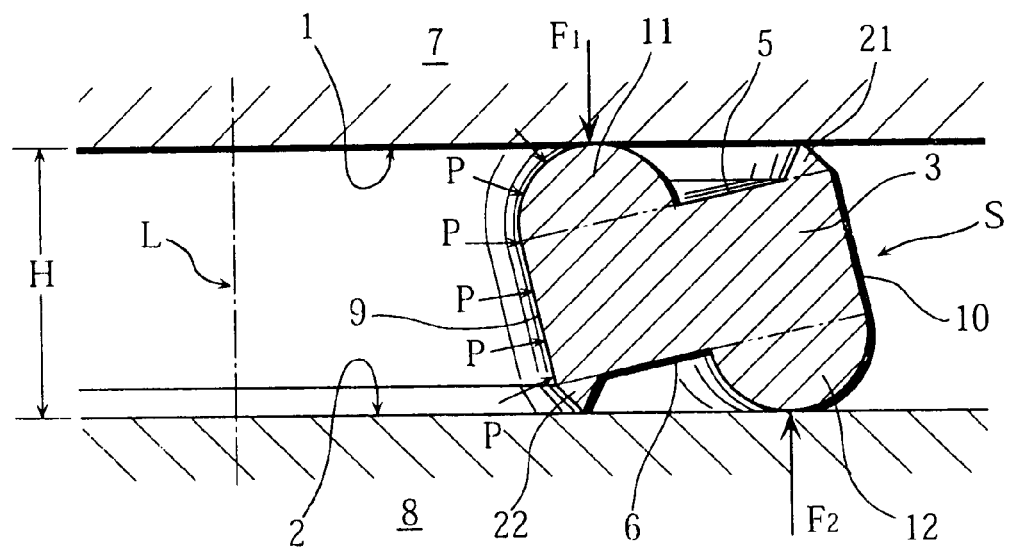
FIG. 18 is a cross-sectional view of a principal portion also serving as a working-explanatory view.

Next, FIGS. 17 and 18 show another embodiment of the metal seal S relating to the present invention. FIG. 17 is a cross-sectional front view in a free state(unattached state), and FIG. 18 is a cross-sectional explanatory view of a principal portion showing a used state, namely, an attached and compressed state.

To describe a cross-sectional configuration, the cross-sectional configuration is composed of an approximately rectangular middle base portion 3, a first contact convex portion 11 and a second contact convex portion 12 both of which are approximately half circular.

The first contact convex portion 11 is disposed on an inner side of the middle base portion 3, and the second contact convex portion 12 is disposed on an outer side of the middle base portion 3.

The first contact convex portion 11 on the inner side contacts the first contact flat face portion 1 and the second contact convex portion 12 on the outer side contacts the second contact flat face portion 2 in the attached state.

And, in a right half of FIG. 17 and FIG. 18, border lines of the middle base portion 3 and the first and second contact convex portions 11 and 12 are shown with two-dot broken lines. In the attached and uncompressed state, end faces 5 and 6 on upper and lower (in Figures) long sides of the middle base portion 3 are parallel to the above-mentioned first and second contact flat face portions 1 and 2 of attachment members (application members) 7 and 8 such as flanges. Although not shown in Figures, one or both of the upper and lower end faces 5 and 6 may not be parallel to (inclined to) the first and second contact flat face portions 1 and 2. Then, the attachment members (application members) 7 and 8 come close each other to make the attached and compressed state shown in FIG. 18. In the attached and compressed state of FIG. 18, torsional elastic deformation around the middle base portion 3 as a center is generated by pressing force $F_1$, $F_2$ from the first and second contact flat face portions 1 and 2.

A mark 21 represents a first auxiliary protrusion of small triangle disposed on an outer side of the end face 5 (upper in FIG. 17) to contact the first contact flat face portion 1 to prevent excessive torsional elastic deformation when fluid pressure P works as in FIG. 18 (pressure-working time).

And, a mark 22 represents a second auxiliary protrusion of small triangle disposed on an inner side of the end face 6 (lower in FIG. 17) to contact the second contact flat face portion 2 to prevent excessive torsional elastic deformation simultaneously in the pressure-working time. The preventive effect of the excessive torsional elastic deformation is especially works when the fluid pressure P is high. However, even when the fluid pressure P is low (or vacuum), the first and second auxiliary protrusions 21 and 22 can prevent the metal seal S itself from being deformed by creeping phenomenon.

In the cross section shown in FIG. 17, the first contact convex portion 11 is disposed on the inner side and the first auxiliary protrusion 21 is disposed on the outer side of the end face 5 of the middle base portion 3 as to protrude, and height dimension (protruding dimension) $H_2 1$ of the first auxiliary protrusion 21 is set to be smaller than height dimension (protruding dimension) $H_1 1$ of the first contact convex portion 11, namely, $H_2 1 < H_1 2$.

On the other hand, the second contact convex portion 12 is disposed on the outer side and the second auxiliary protrusion 22 is disposed on the inner side of the end face 6 of the middle base portion 3 as to protrude, and height dimension (protruding dimension) $H_2 2$ of the second auxiliary protrusion 22 is set to be smaller than height dimension (protruding dimension) $H_1 2$ of the second contact convex portion 12, namely, $H_2 2 < H_1 2$.

As described above, the first contact convex portion 11 and the second contact convex portion 12 are protruding in opposite directions in the axis L direction as to dislocate each other on the inner side and the outer side (in radial directions) with respect to the middle base portion 3 of rectangular cross section. And, the first auxiliary protrusion 21 and the second auxiliary protrusion 22 are simultaneously protruding in opposite directions in the axis L direction as to dislocate each other on the inner side and the outer side (in radial directions) with respect to the middle base portion 3 of rectangular cross section. Further, a short side 9 (forming an inner peripheral face) of the middle base portion 3 of rectangular cross section and the approximately half circular first contact convex portion 11 are continuous (without stages), and the short side 9 is continued (without stages) to the second auxiliary protrusion 22 having small triangle cross section to form a flexed line and disposed on a corner portion of the middle base portion 3 of rectangular cross section.

Further, another short side 10 (forming a peripheral face) of the middle base portion 3 of rectangular cross section and the approximately half circular second contact convex portion 12 are continuous (without stages), and the short side 10 is continued (without stages) to the first auxiliary protrusion 21 having small triangle cross section to form a flexed line and disposed on a corner portion of the middle base portion 3 of rectangular cross section. As described above, the first auxiliary protrusion 21 and the second auxiliary protrusion 22 are point symmetric with respect to the center of gravity of the middle base portion 3. And, the above-mentioned first contact convex portion 11 and the second contact convex portion 12 are point symmetric with respect to the center of gravity.

In the embodiment of FIG. 17 and FIG. 18, the positions of the first auxiliary protrusion 21 and the second auxiliary protrusion 22 may not be on the corner positions continuing from the short side 9 or the short side 10 with the flexed line, but moved slightly inward from the corner positions of the middle base portion 3 as to protrude from the end faces 5 and 6 (not shown in Figures). And, the configuration of the first auxiliary protrusion 21 and the second auxiliary protrusion 22, other than the shown triangle configuration, may have a round tip (R portion) of half circle or half oval (not shown in Figures).

And, the metal seal S in the free state shown in FIG. 17 is disposed between the first and second contact flat face portions 1 and 2, the metal seal S turned (inclined) around (the center of gravity of) the middle base portion 3 by pressing forces $F_1$ and $F_2$ from the pair of the first contact flat face portion 1 and the second contact flat face portion 2 to generate torsional elastic deformation as the first contact flat face portion 1 and the second contact flat face portion 2 come close each other to become the attached and compressed state shown in FIG. 18. And, the mutual interval dimension H is preliminarily set as the first and second auxiliary protrusions 21 and 22 contact the first and second contact flat face portions 1 and 2 respectively. This torsional elastic deformation shown in FIG. 18 returns to the original state in FIG. 17, namely, the free state when the pair of the first and second contact flat face portions 1 and 2 are parted from each other.

Figure 22:
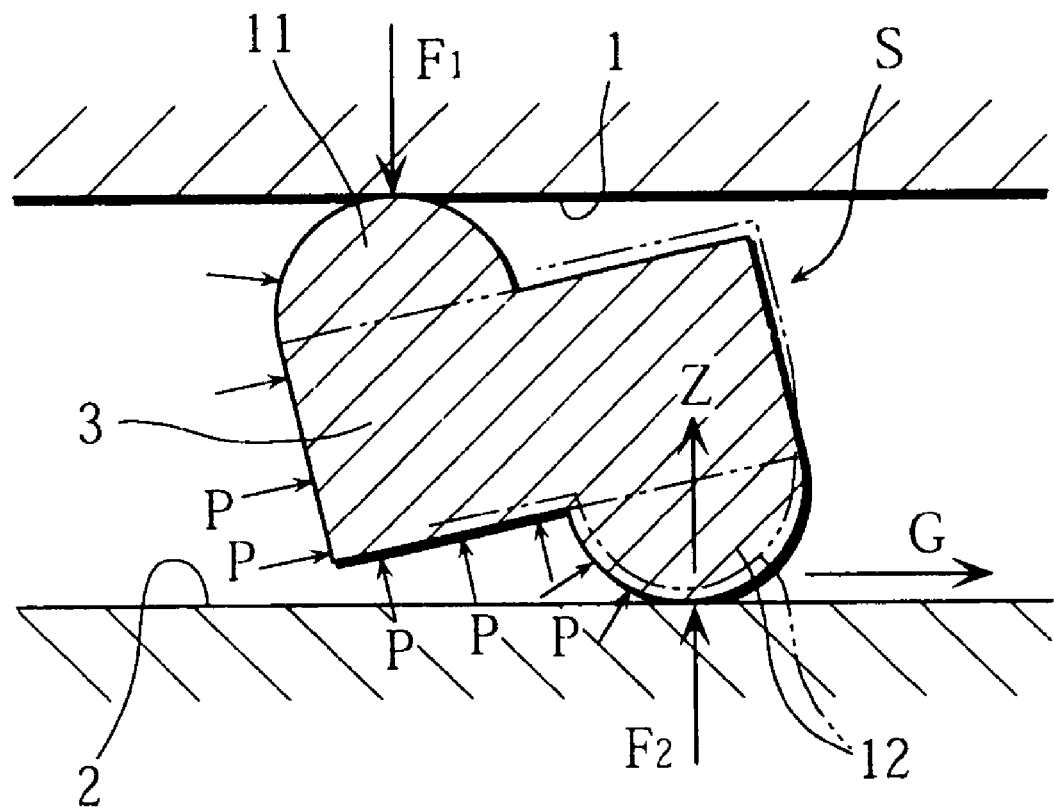
FIG. 22 is a working-explanatory cross-sectional view of a principal portion.

And, in FIG. 18, when the pressure works on the inner side as shown with arrows P, the first auxiliary protrusion 21 contacts the first contact flat face portion 1 and the second auxiliary protrusion 22 contacts the second contact flat face portion 2 to prevent excessive torsional elastic deformation, the second contact convex portion 12 parts (floats up) from the second contact flat face portion 2, and fluid leakage (blowby) in an arrow G direction in FIG. 22 is prevented.

As shown in FIG. 22, although the metal seal S relating to the present invention has quite excellent advantages (characteristics) that the fastening force (refer to the arrows $F_1$ and $F_2$) is low and the resilience is high, the second contact convex portion 12 may float from the second contact flat face portion 2 in an arrow Z direction and fluid leakage (blowby) may be generated in the arrow G direction under the condition of high fluid pressure P, for example, of more than 10 MPa.

That is to say, as shown in FIG. 22, when the high fluid pressure P works on the metal seal S, the metal seal S in the torsional elastic deformation by relatively small fastening force (pressing force) F, and $F_2$ easily floats up in the arrow Z direction as shown with two-dot broken lines, and fluid leakage (blowby) may be generated in the arrow G direction. In FIG. 18, this blowby is effectively prevented.

In short, in the metal seal relating to the present invention, the metal seal S and the first and second contact flat face portions 1 and 2 are effectively prevented from being plastically and partially deformed and damaged by softly receiving the pressing forces $F_1$ and $F_2$ of the application members (attachment members) 7 and 8 with the torsional elastic deformation by inclining or turning around the middle base portion 3, light contact of the first and second auxiliary protrusions 21 and 22 with the application members (attachment members) 7 and 8 to prevent the blowby (shown with the arrow G in FIG. 22), and keeping the contact pressure of the metal seal S and the first and second contact flat face portions 1 and 2 always low.

The embodiment shown in FIG. 17 and FIG. 18 is also effective when the pressure works on the outer side and used for both of inner pressure and outer pressure. That is to say, in FIG. 18, when the fluid pressure works from the outer side, torsion of the metal seal S is stopped by the contact of the second auxiliary protrusion 22 on the second contact flat face portion 2, separation of the first contact convex portion 11 and the first contact flat face portion 1 is blocked to prevent fluid leakage.

Figure 19:
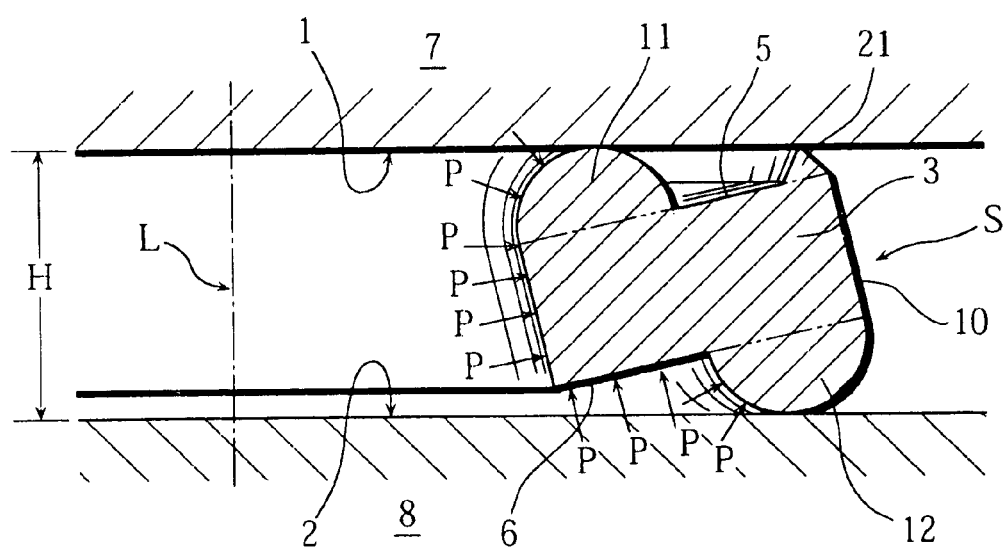
FIG. 19 is a cross-sectional view of a principal portion showing another embodiment.

Next, another embodiment shown in FIG. 19 is described. FIG. 19 is a cross-sectional view of the attached and compressed state instead of the embodiment in FIG. 18. In this metal seal S shown in FIG. 19, the second auxiliary protrusion 22 shown in FIGS. 17 and 18 is omitted. Explanation of the other members of same marks is omitted because they are constructed similarly to the former embodiment.

This metal seal S in FIG. 19 has only the first auxiliary protrusion 21, which contacts the first contact flat face portion 1 to prevent excessive torsional elastic deformation when the pressure works on the inner side, on the outer side. That is to say, this is a seal for inner pressure in which the second contact convex portion 12 is prevented from floating in the arrow Z direction when the pressure (refer to the arrows P) works on the inner side as in FIG. 22, and the fluid leakage in the arrow G direction is prevented.

Figure 20:
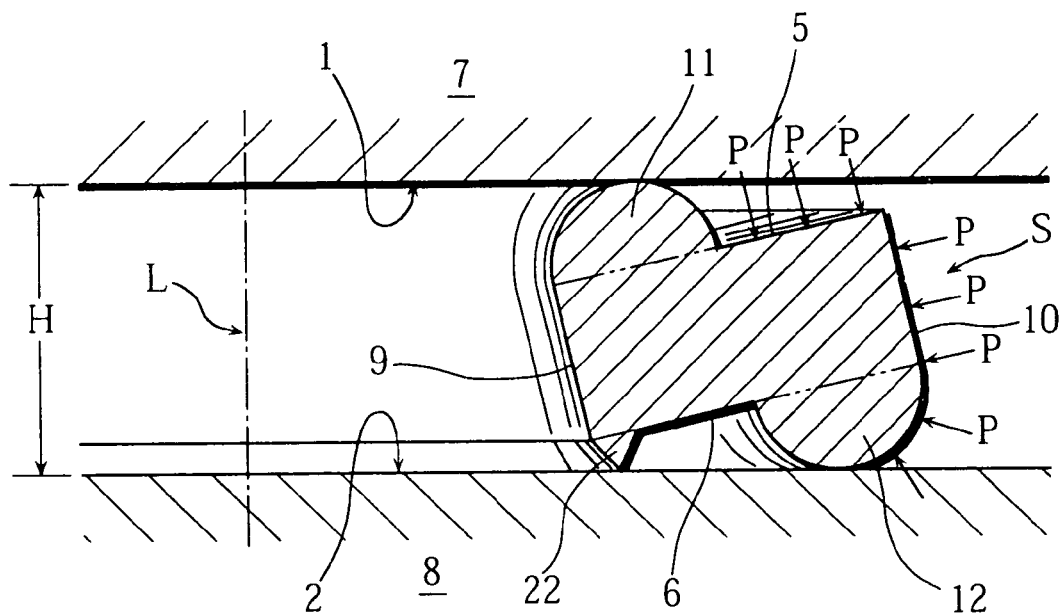
FIG. 20 is a cross-sectional view of a principal portion showing still another embodiment.

Next, another embodiment shown in FIG. 20 is described. FIG. 20 is a cross-sectional view of the attached and compressed state instead of the embodiment in FIG. 18. In this metal seal S shown in FIG. 20, the first auxiliary protrusion 21 shown in FIGS. 17 and 18 is omitted. Explanation of the other members of same marks is omitted because they are constructed similarly to the former embodiment.

This metal seal S in FIG. 20 has only the second auxiliary protrusion 22, which contacts the second contact flat face portion 2 to prevent excessive torsional elastic deformation when the pressure works on the outer side, on the inner side. That is to say, the first contact convex portion 11 is prevented from floating in the arrow Z direction on the first contact flat face portion 1 when the pressure (refer to the arrows P) works on the outer side as in FIG. 20, and the fluid leakage (blowby) from the contact portion (sealing portion) toward the inner side is prevented. Therefore, this metal seal is for outer pressure.

Figure 21:
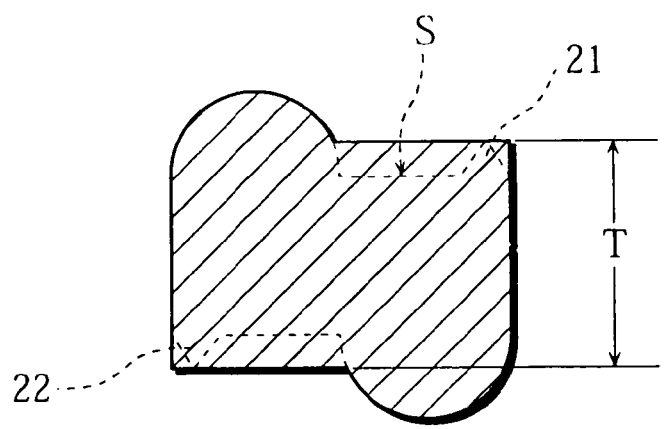
FIG. 21 is an explanatory cross-sectional view comparing a comparative example with an embodiment of the present invention.

In FIG. 21, a cross section composed of solid line shows a comparison example, and a cross section composed of broken lines is the embodiment of FIG. 17 for comparison. That is to say, to obtain floating prevention and fluid leakage prevention effects similar to the description with FIG. 18 without the first and second auxiliary protrusions 21 and 22, thickness dimension T of the middle base portion 3 must be increased as shown with the solid line. With this large thickness dimension T, the pressing forces F.sub.1 and F.sub.2 shown in FIG. 18 extremely increase. That is to say, the advantage of low fastening force of the metal seal S relating to the present invention is spoiled. In other words, FIG. 21 shows that the metal seal S relating to the present invention is an excellent seal which prevents the floating and the fluid leakage described with FIG. 22 with the advantage of low fastening force, namely, low pressing forces F.sub.1 and F.sub.2.

As described above, in the embodiments of the metal seal S relating to the present invention shown in FIGS. 17 through 20, the mutual interval dimension H of the attachment members 7 and 8 can be regulated by the auxiliary protrusions 21 and 22 to restrict excessive deformation and reduce or prevent the creeping deformation (torsional deformation). That is to say, it is an advantage of the auxiliary protrusions 21 and 22 that permanent deformation, namely, creeping deformation is not generated even if the torsional deformation of the metal seal is kept by large fastening force for a long time.

As described above, the metal seal S shown in FIGS. 17 through 20 can maintain stable and sufficient sealability under high pressure during a long period. And, the application members (attachment members) 7 and 8 do not need to have staged portions to contact parts of the metal seal S to prevent excessive torsion.

In the embodiments of FIGS. 17 through 20, the configuration of the first and second auxiliary protrusions 21 and 22, other than the small triangle, may be small polygon, and R-shaped such as small half circle and small oval. And, the middle base portion 3 may be inclined to the first and second contact flat face portions 1 and 2 in the free state to make a great turn (torsion) possible, and the end faces 5 and 6 can be formed into convex curved faces or concave curved faces. And, the first and second contact convex portions 11 and 12 may be polygonal.

According to the above embodiments of FIGS. 17 through 20, excellent sealability under high pressure is secured because fluid leakage such as blowby is prevented by the auxiliary protrusions 21 and 22 protruding from the opposite end faces 5 and 6 even under circumstance of high fluid pressure P.

Figure 23A:
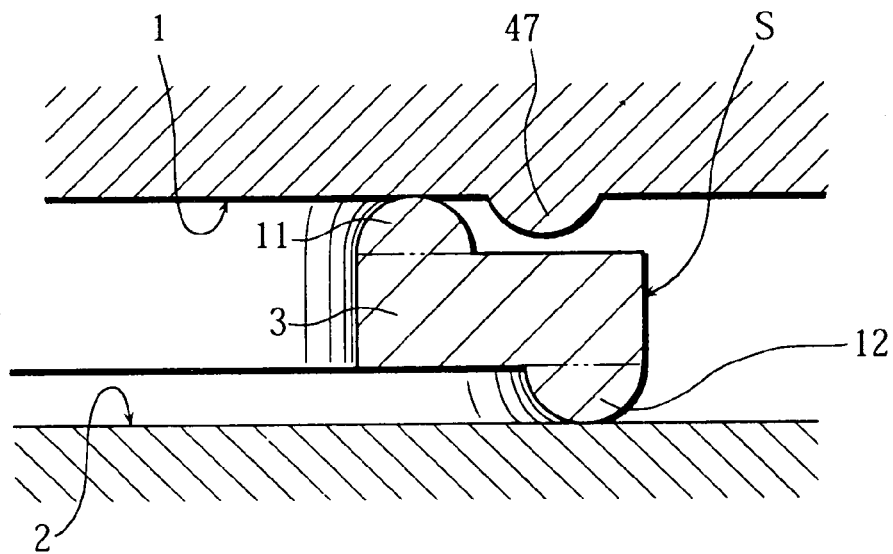
FIG. 23A is an enlarged cross-sectional view of a principal portion showing an attached non-compression state also serving as a working-explanatory view.
Figure 23B:
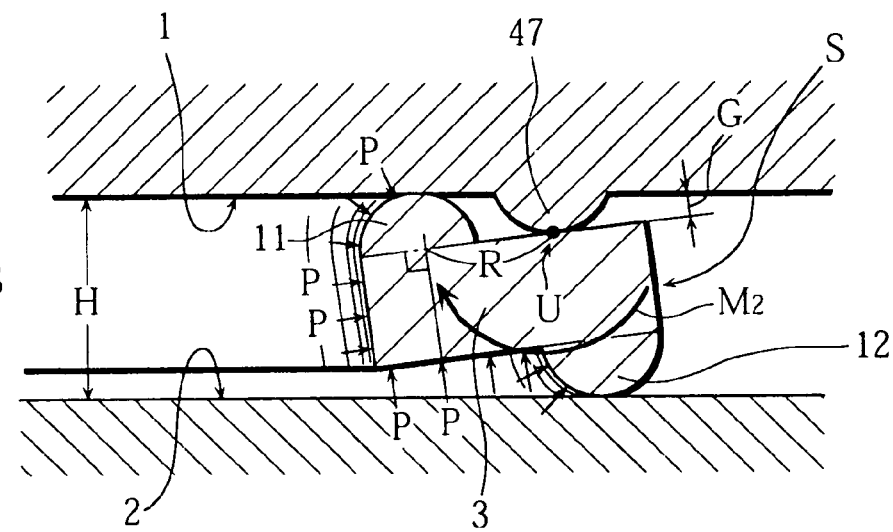
FIG. 23B is an enlarged cross-sectional view of a principal portion showing a pressure-receiving state in an attached compression state also serving as a working-explanatory view.

Next, FIGS. 23A and 23B show another embodiment. This tight-seal construction shown in FIGS. 23A and 23B uses the metal seal described with FIGS. 1 through 3. That is to say, In a tight-seal construction provided with a first contact flat face portion 1 and a second contact flat face portion 2 which are mutually parallel, and a metal seal S of ring as a whole disposed between the first contact flat face portion 1 and the second contact flat face portion 2, the metal seal S has a middle base portion 3, a first contact convex portion 11 which contacts the first contact flat face portion 1, and a second contact convex portion 12 which contacts the second contact flat face portion 2, the first contact convex portion 11 is disposed on an inner side and the second contact convex portion 12 is disposed on an outer side uncorrespondingly each other, torsional elastic deformation turning around the middle base portion 3 as a center is generated in an attached and compressed state, and a protruding portion 47 to contact the middle base portion 3 is disposed on the first contact flat face portion 1 as a moment M.sub.2 is generated in the metal seal S in an opposite direction of the torsional elastic deformation by fluid pressure P in a pressure-receiving state in which the fluid pressure P works. And, different from FIGS. 23A and 23B, the protruding portion 47 may be formed on the second contact flat face portion 2 (not shown in Figures).

And, in the pressure-receiving state (refer to FIG. 23B) and a non pressure-receiving state of the attached and compressed state, the metal seal S is attached as to be pressed and held on 3 points of the first contact convex portion 11, the second contact convex portion 12, and a contact point of the protruding portion 47 on the middle base portion 3, and not pressed on other than the 3 points.

To describe further in detail, FIG. 23A shows an attached and uncompressed state, and FIG. 23B shows a pressure-receiving state of the attached and compressed state.

As shown in FIGS. 23A and 23B, in the cross-sectional configuration of the metal seal S, the middle base portion 3 is approximately rectangular, and the first and second contact convex portions 11 and 12 are approximately half circular (or half oval). The first contact convex portion 11 is disposed on an inner side, and the second contact convex portion 12 is disposed on an outer side as to be on different positions each other in a diameter direction.

And, as the first and second contact flat face portions 1 and 2 in the attached and uncompressed state in FIG. 23A come close each other to make the attached and compressed state, torsional elastic deformation turning counterclockwise around the middle base portion 3 as a center is generated, and the protruding portion 47 contacts and presses a back face (non pressure-receiving face) of the middle base portion 3.

In FIG. 23B, the protruding portion 47, approximately half circular or half oval, contacts an outer position to a middle position of the middle base portion 3 in the diameter direction. FIG. 23B shows the pressure receiving state in the attached and compressed state in which the fluid pressure P works as inner pressure. Total sum of the product of the fluid pressure P and length R of perpendicular from a supporting point U, where the protruding portion 47 contacts the middle base portion 3, to each fluid pressure P is the moment $M_2$ working on the metal seal S clockwise.

This moment $M_2$ is in opposite direction of the rotational moment of the torsional elastic deformation by the contact of the first and second contact convex portions 11 and 12 with the first and second contact flat face portions 1 and 2.

The second contact convex portion 12 is always pressed to the second contact flat face portion 2 by the moment $M_2$ generated by the fluid pressure P to prevent fluid leakage on this portion.

The configuration of the protruding portion 41, not restricted to FIGS. 23A and 23B and can be freely changed, may be approximately triangle. And, in the cross-sectional configuration of the metal seal S, the first and second contact convex portions 11 and 12 may be approximately triangle (refer to FIG. 11) and other polygonal, and the middle base portion 3 shown in FIGS. 23A and 23B in the uncompressed state (free state) may be a parallelogram as in FIG. 7 or rugby-ball shape as in FIG. 8.

In the tight-seal construction relating to the present invention, floating phenomenon that the second contact convex portion 12 on the outer side is parted from the second contact flat face portion 2 when the fluid pressure P as inner pressure becomes high is effectively prevented by the protruding portion 47 to keep sealability under high pressure. And, the sealability can be artfully kept against the high fluid pressure P without excessive fastening of the first and second contact flat face portions 1 and 2 each other in closing directions. In other words, in the tight-seal construction shown in FIGS. 23A and 23B, the higher the fluid pressure P becomes, the more the moment $M_2$ increases to enhance the sealability.

The metal seal S is turned in the moment $M_2$ direction by leverage of which supporting point is the point U where the protruding portion 47 contacts the metal seal S to tightly press the sealing contact portion for sealing.

And, the fastening force does not excessively increase even if the first and second contact flat face portions 1 and 2 rather excessively come close each other (if the deformation amount becomes large) because the gap G is always remaining and the end portions of the metal seal S are not restricted but free. Excessive pressure on the contact portion is prevented by the free state retaining the gap G to prevent collapse and creeping deformation even if dispersion exists in the dimensional tolerance of each construction member and worked-out dimension of the groove. The sealability can be maintained for a long time thereby.

And, the tight-seal construction can enhance the sealability utilizing the fluid pressure itself (retaining the low fastening force) under the circumstance of high fluid pressure P. As described above, the present invention is a tight-seal construction does not require complex construction and parts to enhance the sealability under high pressure.

Figure 24A:
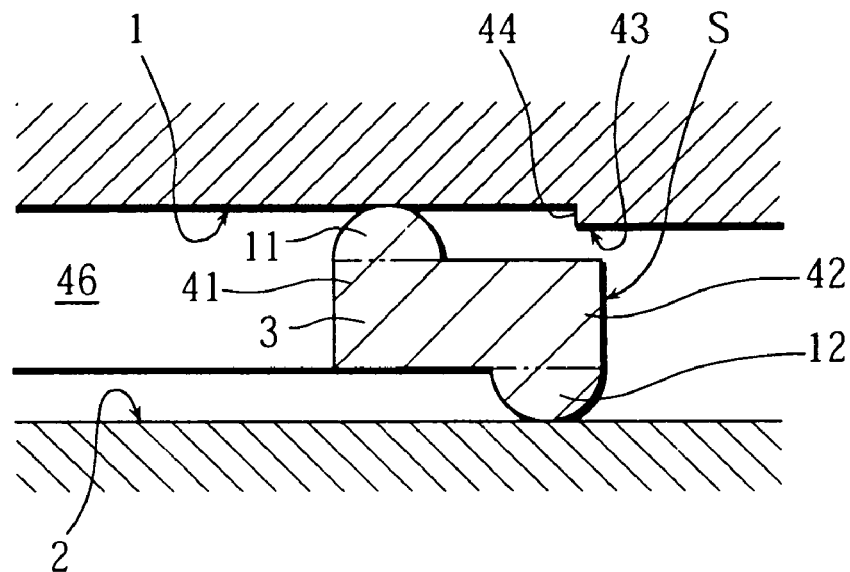
FIG. 24A is an enlarged cross-sectional view of a principal portion of another embodiment showing an attached non-compression state also serving as a working-explanatory view.
Figure 24B:
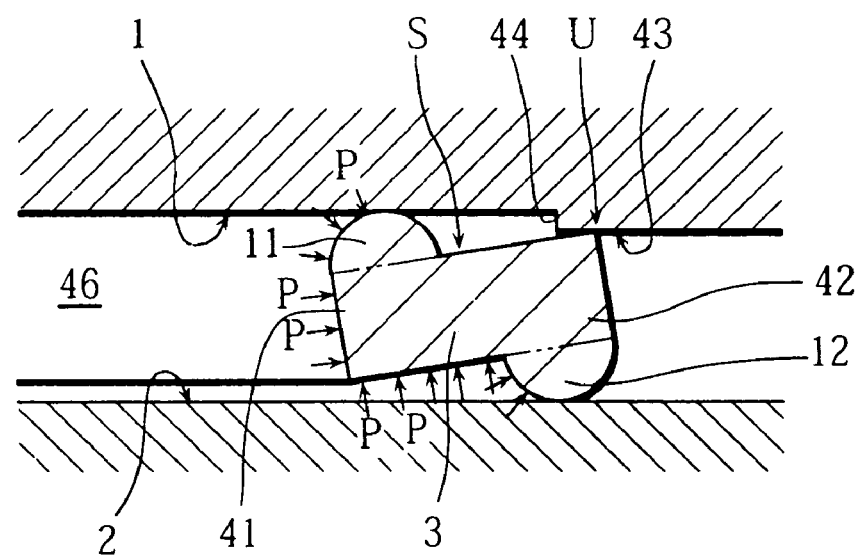
FIG. 24B is an enlarged cross-sectional view of a principal portion of the embodiment of 24A showing a pressure-receiving state in an attached compression state also serving as a working-explanatory view.

Next, FIGS. 24A and 24B show another embodiment. This tight-seal construction uses the metal seal described with FIGS. 1 through 3. That is to say, in a tight-seal construction provided with a first contact flat face portion 1 and a second contact flat face portion 2 which are mutually parallel, and a metal seal S of ring as a whole disposed between the first contact flat face portion 1 and the second contact flat face portion 2, the metal seal S has a middle base portion 3, a first contact convex portion 11 which contacts the first contact flat face portion 1, and a second contact convex portion 12 which contacts the second contact flat face portion 2, the first contact convex portion 11 is disposed on an inner side and the second contact convex portion 12 is disposed on an outer side uncorrespondingly each other, torsional elastic deformation turning around the middle base portion 3 as a center is generated in an attached and compressed state, and, a pressing portion 43 for another end, which presses another end 42 opposite to an end portion 41 on a pressure-receiving chamber 46 side in the attached and compressed state, is disposed on a plane different from the first contact flat face portion 1 and the second contact flat face portion 2. And, a moment in opposite direction of the torsional elastic deformation is generated in the metal seal S by the fluid pressure P in the pressure-receiving state in which the fluid pressure P works.

And, the pressing portion 43 is formed with a staged portion 44 on a plane different from the first contact flat face portion 1 and the second contact flat face portion 2.

Further, FIG. 24A shows an attached and uncompressed state, and FIG. 24B shows a pressure-receiving state of the attached and compressed state.

As shown in FIGS. 24A and 24B, in the cross-sectional configuration of the metal seal S, the middle base portion 3 is approximately rectangular, and the first and second contact convex portions 11 and 12 are approximately half circular (or half oval). The first contact convex portion 11 is disposed on an inner side, and the second contact convex portion 12 is disposed on an outer side as to be on different positions each other in a diameter direction.

And, as the first and second contact flat face portions 1 and 2 in the attached and uncompressed state in FIG. 24A come close each other to make the attached and compressed state, torsional elastic deformation turning counterclockwise around the middle base portion 3 as a center is generated, and the pressing portion 43 of flat face on the plane contacts and presses a corner portion on the peripheral edge (the end portion 42) of the middle base portion 3.

The pressing portion 43 exists on the plane protruding downward from the first contact flat face portion 1 with the staged portion 44. In FIG. 24B, in the pressure-receiving state in which the fluid pressure P works as inner pressure on the pressure-receiving chamber 46 side, the total sum of rotational moment by the fluid pressure P around the point U where the end portion 42 (peripheral edge) contacts the pressing portion 43 is clockwise, the second contact convex portion 12 is always pressed to the second contact flat face portion 2 to prevent the fluid leakage (blowby) from the part between the second contact convex portion 12 and the second contact flat face portion 2.

In the cross-sectional configuration of the metal seal S, the first and second contact convex portions 11 and 12 may be approximately triangle and other polygonal, and the middle base portion 3 in the uncompressed state (free state) may be a parallelogram or rugby-ball shape.

In the construction described above, floating phenomenon that the second contact convex portion 12 on the outer side is parted from the second contact flat face portion 2 when the fluid pressure P as inner pressure becomes high is effectively prevented by the pressing portion 43 to keep sealability under high pressure. When outer pressure works, floating phenomenon that the first contact convex portion 11 on the inner side is parted from the first contact flat face portion 1 when the fluid pressure P as outer pressure becomes high is effectively prevented by the pressing portion 43 of flat face formed (although not shown in Figures) on the second contact flat face portion 2 side to press a corner portion of the end portion 41 (inner peripheral edge) to keep sealability under high pressure. Further, the sealability can be artfully kept against the high fluid pressure P (under high-pressure circumstance) without excessive fastening of the first and second contact flat face portions 1 and 2 each other in closing directions. And, the tight-seal construction can enhance the sealability utilizing the fluid pressure itself (retaining the low fastening force) under the circumstance of high fluid pressure. As described above, the present invention is a tight-seal construction does not require complex construction and parts to enhance the sealability under high pressure.

According to the metal seal of the present invention, amount of elastic resilience (elastic deformation area) is large to correspond to a wide range of the set height (refer to the mark H in FIGS. 14 through 16) because torsional elastic deformation is generated in the whole seal in the attached and compressed state. Therefore, even if the dimensional tolerance of the concave portion (concave groove) of the attachment member is rough, stable and high sealability is always achieved. And, the seal can be applied to the attachment member (such as a flange) of brittle material and soft material because the seal is used with low fastening force.

And, a small seal of which outer diameter is less than 6 mm, difficult to make of a metal O-ring, is made with relatively low cost. And, damage on the first and second contact flat face portions 1 and 2 is reduced.

And, while the seal turns (inclines) around the middle base portion 3 as a center to generate torsional elastic deformation, excellent sealability is provided because the first and second contact convex portions 11 and 12 always stably contact the first and second contact flat face portions 1 and 2 and slowly change the position as a whole within the wide range of the set height H. Further, it is relatively easy to work the seal with cutting, etc.

And, stable sealability can be achieved within a further wide range of the set height H. And, the air well (space 17) is prevented from being formed by restriction of some portions such as the corner portion 15 (refer to FIG. 6 and FIG. 16) as not to contact the second contact flat face portion 2.

And, the application member 8, to which the second contact convex portion 12 is pressed, is prevented from being damaged even if made of brittle or soft material.

And, torsional resilient force is effectively generated by prevention of the whole seal from inclining excessively by receiving the pressure.

Figure 5:
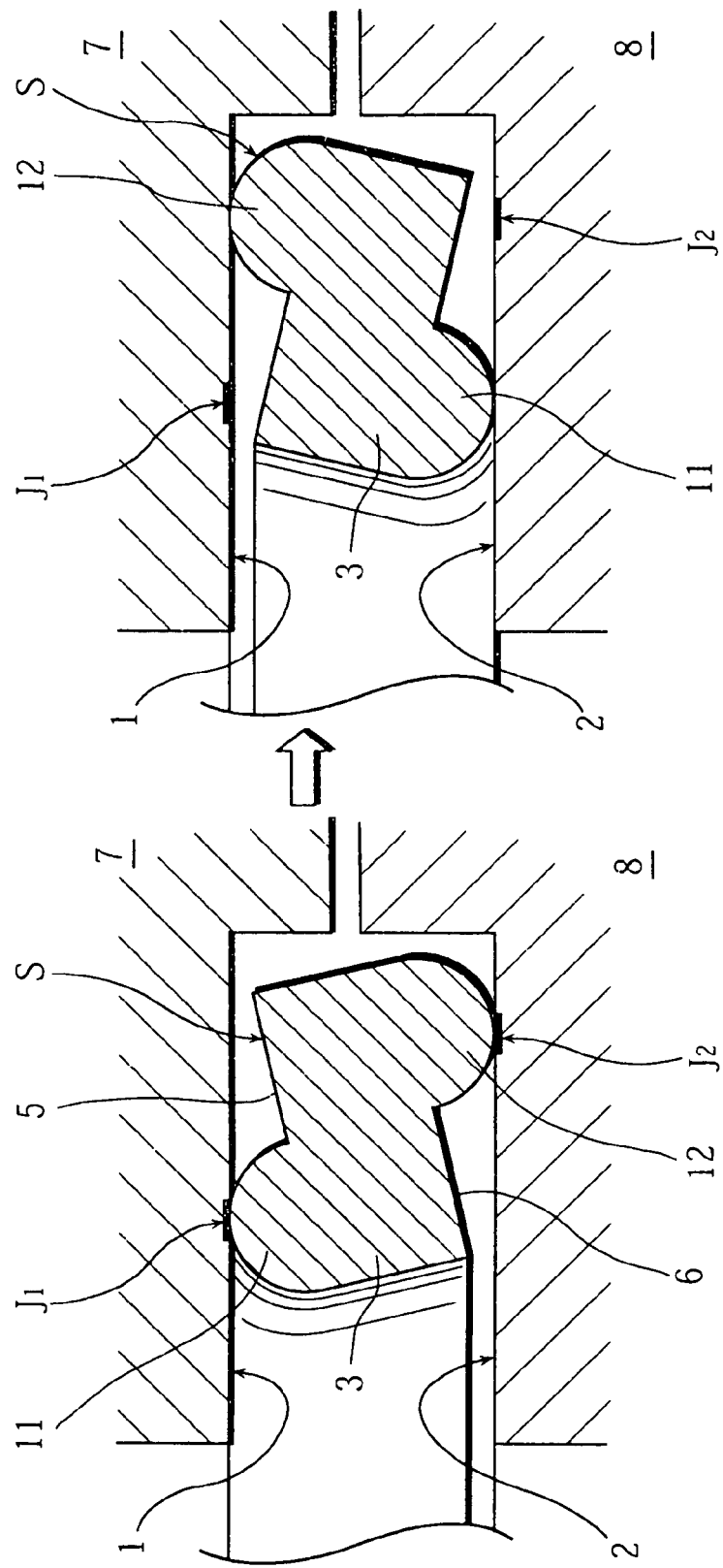
FIG. 5A is a cross-sectional view showing a usage an apparatus of the present invention.
FIG. 5B is a cross-sectional view showing the usage the apparatus of the present invention.

And, the operation period (life) of the seal can be extended by overturning the seal from the first assembled state to the second assembled state (refer to FIG. 5).

And, according to the metal seal of the present invention, the seal is used with low fastening force and applied to the attachment members (such as flanges) 7 and 8 of brittle or soft materials because the seal is constructed to generate torsional elastic deformation in the attached and compressed state.

And, the seal is practically excellent because relatively easy to made as a small seal of which outer diameter is less than 6 mm which is difficult to make of a metal O-ring. And, the damage on the contact flat face portions 1 and 2 can be reduced.

Further, adding to the many advantages described above, fluid leakage such as blowby can be prevented by the auxiliary protrusion 21 and/or the auxiliary protrusion 22 under the high-pressure circumstance. And, excellent sealability can be kept for a long time without creeping deformation after a long operation period under high pressure and low pressure (vacuum). And, the seal is used for both of inner pressure and outer pressure.

And, according to the tight-seal construction of the present invention, the seal is used with low fastening force, and applied to the attachment member (such as flange) of thin wall and low strength. And, under the condition of high fluid pressure P, retaining the low fastening force, the sealability is kept by receiving the moment $M_{.sub.2}$ generated by the fluid pressure P around the contact point U of the protruding portion 47 on the metal seal S in opposite direction of the torsional elastic deformation.

And, the amount of elastic resilience (elastic deformation area) is large to correspond to a wide range of set height, namely, the mutual interval dimension of the first and second contact flat face portions 1 and 2 because the torsional elastic deformation is generated in the whole seal in the attached and compressed state, and stable high sealability is always achieved within a wide range from low to high pressure even if the dimensional tolerance of the attachment member is rough.

And, the low fastening force is kept in both of the pressure-receiving state and the non pressure-receiving state of the attached and compressed state. That is to say, excellent sealability is achieved for a long time because the attachment member such as a flange does not require excessive fastening load to simplify the construction, and large contact pressure portions do not exist on the metal seal not to damage contact faces of the first and second contact flat face portions 1 and 2.

The seal is used with low fastening force, and applied to the attachment member (such as flange) of thin wall and low strength. And, under the condition of high fluid pressure P, retaining the low fastening force, the floating of the metal seal S is effectively restricted to prevent fluid leakage such as blowby.

Further, the construction is easily made.

While preferred embodiments of the present invention have been described in this specification, it is to be understood that the invention is illustrative and not restrictive, because various changes are possible within the spirit and indispensable features.

What is claimed is:

1. A metal seal of ring as a whole disposed between a first contact flat face portion and a second contact flat face portion, comprising a middle base portion, a first contact convex portion which contacts the first contact flat face portion, and a second contact convex portion which contacts the second contact flat face portion, in which the first contact convex portion is protruding from a position on an inner side of the middle base portion, the second contact convex portion is protruding from a position on an outer side of the middle base portion, and torsional elastic deformation turning around the middle base portion as a center is generated by pressing force from the first contact flat face portion and the second contact flat face portion in an attached and compressed state;

wherein the cross section of the middle base portion is approximately rectangular, an end face of the middle base portion from which the first contact convex portion is protruding is formed as a sloped face such that a gap between the sloped face and the first contact flat face portion is gradually increased toward the outer side in an attached and uncompressed state, and an end face of the middle base portion from which the second contact convex portion is protruding is formed as a second sloped face such that a gap between the second sloped face and the second contact flat face portion is gradually increased toward the inner side in an attached and uncompressed state.

* * * * *